Oct. 13, 1925.
E. H. PECKINPAUGH
1,557,083
ARTIFICIAL BAIT
Filed Feb. 6, 1923
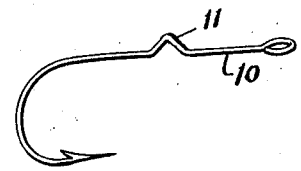
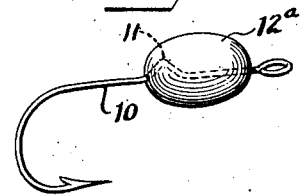
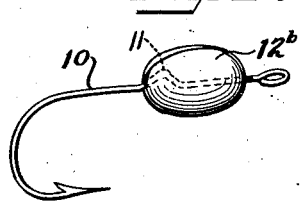
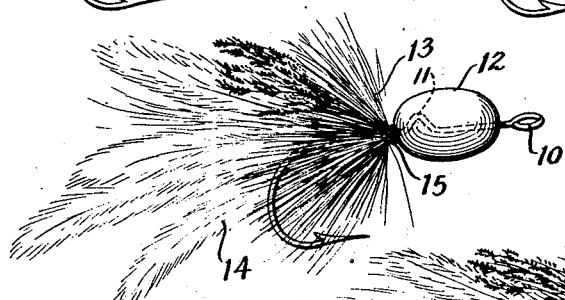
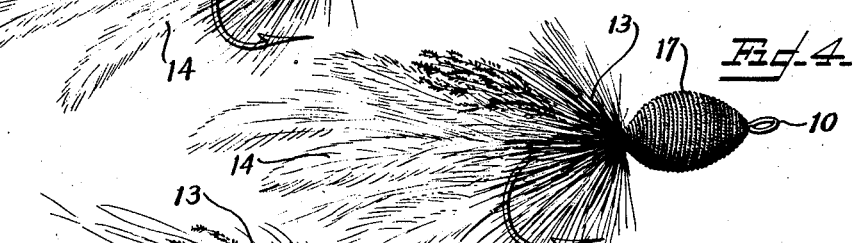
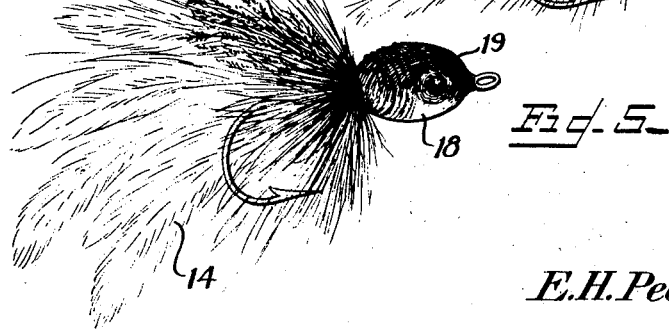

Patented Oct. 13, 1925.

1,557,083

UNITED STATES PATENT OFFICE.

ERNEST HILARY PECKINPAUGH, OF CHATTANOOGA, TENNESSEE.

ARTIFICIAL BAIT.

Application filed February 6, 1923. Serial No. 617,319.

*To all whom it may concern:*

Be it known that I, ERNEST H. PECKINPAUGH, a citizen of the United States, residing at Chattanooga, in the county of Hamilton and State of Tennessee, have invented new and useful Improvements in Artificial Baits, of which the following is a specification.

This invention relates to fish lures and to an improved method of making the same.

The principal objects of the invention are to provide an underwater lure which is more durable and more attractive to fish than the lures now on the market. A particular object is to provide a lure which simulates a minnow in appearance and movement and which is caused to travel under water when pulled by the fisherman, thus attracting game fish when they are not interested in lures on the surface. The improved lure is handled effectively by a bait casting rod, and is also useful in trolling.

In the accompanying drawing forming part of this specification, there is shown by way of illustration an artificial bait made in accordance with the invention.

In the drawing:—

Figure 1 shows in elevation the preferred type of hook used for the lure;

Figure $2^a$ is a similar view showing the first step in the process, a sinker having been united with the hook of Fig. 1;

Fig. $2^b$ is a view like Fig. $2^a$, but showing a different manner of securing the sinker;

Fig. 3 is an elevation showing the second step in the process, with feathers tied to the hook;

Fig. 4 is a similar view illustrating the bait at the completion of the third step, twine having been wrapped about the body or sinker; and Fig. 5 shows the completed lure.

Referring more specifically to the preferred form of the invention illustrated in the drawing exemplifying other possible embodiments of the invention, there is shown in Fig. 1 a hook 10 which has a bend or loop 11 in its shank. I prefer a hook such as is shown because similar hooks are on the market; but instead of using a hook having a bend, I may employ a metallic disk soldered to the hook somewhat as described in my co-pending application, Serial No. 584,850. It is preferred that the hook have a shape permitting a sinker, preferably of lead, to be affixed to it, but if a lure of low specific gravity is desired, a light weight body of any size and shape such as the disk of my aforesaid application, may be secured to the shank of the hook. In Fig. $2^a$ a sinker $12^a$ of lead is molded about the shank, while in Fig. $2^b$ the sinker $12^b$ is initially split or grooved and after the hook is laid in the groove, the edges of the sinker are closed about the hook. It is preferred that the bend 11 and the body $12^a$ or $12^b$ be so arranged and proportioned that the body extends substantially to the eye of the hook, as shown.

After the body 12, whether a sinker or other element, is secured upon the hook, feathers 13, 14, or similar materials are tied to the hook as at 15, said tie being preferably immediately adjacent the end of the body 12, for a reason to be explained, a water-proofing substance may be applied to the tie. The feathers 13, 14, extend out from the tie so as to envelop and obscure the point of the hook.

The next step is to wrap a cord, thread or piece of twine about the body 12. The object is to provide a surface for the body to which enamel will permanently adhere. It has been found that if enamel is applied directly to the body 12, if of lead, the enamel will become tarnished, and will chip or flake off, because of the frequent knocks which a heavy body is subjected to, especially when suspended from a lure and dragged over rocks, gravel and the like. To impart to the body the best surface a length of textile cord, twine or thread is wound transversely about the body, starting at either end and proceeding to the other end. Wire will not answer for my purpose. In Fig. 4 the cord 17 is wound one or more layers over the sinker, so as completely to cover the sinker and also completely cover the tie 15. The ends of the cord 17 may be secured by tying, by an adhesive, or by a pin, or the like. The resultant covering is unbroken, is elastic, and provides an ideal base for the enamel.

The final step in the process is to coat with waterproof enamel the textile covering provided by cord 17. This may be done by hand, or by the air brush, or by the two methods combined. The enamel used consists principally of a material like celluloid with other ingredients added to give the proper color and make the application of the same practical. The enamel has elasticity, holds its color regardless of the length of time immersed in the water, and adheres to the material and retains its finish under varying changes of temperature and the changing conditions met with in actual use of fishing. A number of coatings 18 of contrasting colors are frequently applied, and as shown, in Fig. 5, eyes 19, are painted or otherwise formed near the head of the bait. I may use artificial eyes, such as are described in my copending application, referred to above.

Among the advantages of the invention may be noted the durability of the bait, its low cost of manufacture and its attractive appearance. The lure will tend to sink in the water more or less rapidly depending on the material of body 12, so that the character and uses of the bait may be varied considerably.

In actual use the lure has been proved to be a "killing" bait.

While I have described a preferred form of lure and one method of making it many changes from the above disclosure may be made without departing from my invention, which is best defined in the following claims.

What is claimed is:

1. An artificial bait comprising, in combination, a hook, a body united to the shank of the hook, feathers tied to the hook shank adjacent one end of the body, a flexible fibrous element wound closely about the body and extended beyond the body and also about the feather tie, and waterproof enamel applied to said wrapping whereby the feather tie is protected from the water.

2. An artificial bait comprising, in combination, a hook, a body mounted on the shank of the hook, a flexible fibrous element wrapped closely about said body, so as substantially to cover said body, and waterproof enamel applied to the wrappings so as to protect the body, the fibrous character of the wrapper element preventing the enamel from flaking or chipping off.

3. An artificial bait comprising, in combination, a fishhook having a bend in its shank intermediate the eye and the bill of the hook, a sinker mounted upon the hook to envelop the bend in the hook shank and extending from said bend to the eye of the hook, a flexible fibrous element wrapped about said sinker to completely cover the same, and feathers fastened to the hook shank by said fibrous element adjacent the sinker so as to obscure the point of the hook.

4. An artificial bait comprising, in combination, a hook, a body secured to and mounted on the hook shank, a cord wrapped transversely about the body so as to cover the body, and waterproof enamel applied to the wrapped body so as to fill the interstices between the wrappings of the cord and also the cord itself and to provide a substantially smooth waterproof surface for the lure.

5. The method of making an artificial bait which consists in mounting a body on the shank of a hook, tying feathers to the hook at one end of the body, wrapping a cord or thread about said body and about the tie for the feathers, and applying a waterproof enamel to the wrappings of the cord or thread.

6. The method of making an artificial bait which consists in securing a sinker upon the shank of a hook, wrapping a cord or the like transversely about the sinker so as completely to cover the sinker from end to end, and coating the wrappings of the cord with waterproof enamel of such a nature that a smooth surface for the bait results.

7. The method of making an artificial bait which consists in securing a sinker upon the shank of a hook with one end adjacent the eye of the hook, tying feathers to the hook adjacent the sinker, wrapping a cord about the sinker to envelop it and also to envelop the tie, and coating the wrappings of the cord with water proof enamel of such a nature that a smooth surface results.

In testimony that I claim the foregoing as my own, I have hereto affixed my signature.

ERNEST HILARY PECKINPAUGH.